United States Patent
Alsina et al.

(10) Patent No.: US 10,810,250 B2
(45) Date of Patent: Oct. 20, 2020

(54) REVISITING CONTENT HISTORY

(71) Applicant: Apple Inc., Cupertino, CA (US)

(72) Inventors: Thomas Alsina, Mountain View, CA (US); Kenley Sun, Cupertino, CA (US); David T. Wilson, Campbell, CA (US); Sagar A. Joshi, San Jose, CA (US); Nicholas James Paulson, San Francisco, CA (US); Arvind S. Shenoy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 15/379,060

(22) Filed: Dec. 14, 2016

(65) Prior Publication Data
US 2017/0154047 A1    Jun. 1, 2017

Related U.S. Application Data

(63) Continuation of application No. 14/186,965, filed on Feb. 21, 2014, now Pat. No. 9,552,359.

(51) Int. Cl.
  *G06F 16/435* (2019.01)
  *G06F 16/438* (2019.01)

(52) U.S. Cl.
  CPC ........ *G06F 16/4387* (2019.01); *G06F 16/435* (2019.01)

(58) Field of Classification Search
  CPC ......... G06F 17/30053; G06F 17/30029; G06F 16/4387; G06F 16/435
  See application file for complete search history.

(56) References Cited

U.S. PATENT DOCUMENTS

| | | | | |
|---|---|---|---|---|
| 8,776,122 | B2* | 7/2014 | Adimatyam | H04N 5/775 725/40 |
| 9,524,339 | B2* | 12/2016 | Brown | G06F 17/30778 |
| 2001/0044795 | A1* | 11/2001 | Cohen | G06F 17/30699 |
| 2002/0026442 | A1* | 2/2002 | Lipscomb | G06F 17/30861 |
| 2002/0170062 | A1* | 11/2002 | Chen | G06F 16/738 725/86 |
| 2003/0037034 | A1* | 2/2003 | Daniels | G06Q 10/087 |
| 2005/0055357 | A1* | 3/2005 | Campbell | G06F 8/61 |
| 2006/0029093 | A1 | 2/2006 | Van Rossum | |
| 2007/0239675 | A1* | 10/2007 | Ragno | G06F 16/951 |

(Continued)

OTHER PUBLICATIONS

Ringel et al. "Milestones in time: The value of landmarks in retrieving information from personal stores," In Proc. Interact, vol. 2003, pp. 184-191, 2003.

*Primary Examiner* — Jay A Morrison
(74) *Attorney, Agent, or Firm* — Polsinelli (57) ABSTRACT

The content items presented to a user account as part of a media station can be recorded in a content history index, which can be requested and presented to the user account. The content history can enable a user to revisit the content items included in the content history and/or provide feedback regarding the content items. The version of the content item returned to the user can be based on the client device used to request the content item. For example, a user that was presented a content item on their mobile device, can later request to revisit the content item on their PC and receive a version of the content item best suited for presentation by the PC, rather than the version presented on the mobile device.

24 Claims, 5 Drawing Sheets (56) References Cited

U.S. PATENT DOCUMENTS

| | | |
|---|---|---|
| 2008/0071544 A1* | 3/2008 | Beaufays .......... G06F 17/30867 704/270.1 |
| 2008/0092158 A1* | 4/2008 | Bhatnagar .......... H04N 7/17318 725/34 |
| 2008/0183573 A1 | 7/2008 | Muschetto |
| 2008/0256176 A1 | 10/2008 | Huang |
| 2010/0057782 A1* | 3/2010 | McGowan ......... H04N 21/2387 707/E17.009 |
| 2010/0088170 A1 | 4/2010 | Glore, Jr. |
| 2011/0276400 A1 | 11/2011 | Kurnit et al. |
| 2011/0276552 A1 | 11/2011 | Loeb et al. |
| 2012/0072379 A1* | 3/2012 | Weising ............... G06N 99/005 706/11 |
| 2012/0110616 A1 | 5/2012 | Kilar et al. |
| 2012/0150972 A1 | 6/2012 | Morris et al. |
| 2012/0167151 A1* | 6/2012 | Cho ................. H04N 21/47202 725/93 |
| 2012/0278173 A1 | 11/2012 | Vaidyanathan et al. |
| 2012/0322472 A1 | 12/2012 | Nordberg |
| 2013/0151580 A1 | 6/2013 | Singh |
| 2014/0172854 A1* | 6/2014 | Huang ................ G06F 21/6245 707/737 |
| 2014/0188925 A1* | 7/2014 | Skolicki ............ H04N 21/4622 707/765 |
| 2015/0046949 A1* | 2/2015 | Kalantri ............ H04N 21/4312 725/46 |
| 2015/0150038 A1* | 5/2015 | Hao ........................ G06F 21/00 725/31 |

* cited by examiner

REVISITING CONTENT HISTORY

CROSS REFERENCE TO RELATED APPLICATIONS

This application is a continuation of, and claims the benefit of priority to, U.S. application Ser. No. 14/186,965, filed on Feb. 21, 2014, which is expressly incorporated by reference herein in its entirety.

TECHNICAL FIELD

The present disclosure relates to recording a content history and more specifically to revisiting content items listed in the content history.

BACKGROUND

Invitational content items such as advertisements have commonly been presented alongside traditional media, such as television and radio. Due to the nature of traditional media, the advertisements presented have not provided an interactive experience in which a user can engage with the advertisement to select further information or to make an immediate purchase.

The internet, in contrast, allows for media rich interactive advertisements that allow a user to request further information, access secondary information, etc. While these advertisements provide much greater functionality, a user is not always in an appropriate setting to interact with the advertisement to fully appreciate everything that is offered. For example, a user streaming a media stream while driving may not be able to interact with their mobile device to properly engage with the advertisement. Likewise, a user on a mobile device with a smaller display may wish to interact with the advertisement when using their desktop, laptop or tablet Personal Computer (PC) that provides a much larger display.

Currently, a user has no way of re-accessing an advertisement that was presented to the user. For example, a user unable to interact with an advertisement presented while driving cannot access the advertisement at a more convenient to engage with the advertisement. As a result, users miss out on information that they are interested in and advertisers get less value from their marketing efforts.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for revisiting content items included in a content history. A content item can include any type of content presented as part of the media station, such as media items, buffer content items and invitational content items. The content items presented to a user as part of a media station can be recorded in a content history. For example, a content history index can be maintained that includes content item identifiers identifying content items presented to the user. The user can request their content history, which can be gathered from the content history index. The content history can be presented to enable the user to select to revisit any of the content items previously presented to the user that are listed in the content history. For example, a user can select a content item presented in the content history, causing a content request to present the content item to be transmitted and the content item being returned and presented to the user.

In some embodiments, the version of the content item returned to the user can be based on the client device used to request the content item. For example, a user that was presented a content item on their mobile device, can later request to revisit the content item on their PC and receive a version of the content item best suited for presentation by the PC, rather than the version presented on the mobile device. A user can thus, request to revisit a content item on a client device of their choice and be presented with a version of the content item best suited for the selected client device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for revisiting content items included in a content history. A content item can include any type of content presented as part of the media station, such as media items, buffer content items and invitational content items. The content items presented to a user as part of a media station can be recorded in a content history. For example, a content history index can be maintained that includes content item identifiers identifying content items presented to the user. The user can request their content history, which can be gathered from the content history index. The content history can be presented to enable the user to select to revisit any of the content items previously presented to the user that are listed in the content history. For example, a user can select a content item presented in the content history, causing a content request to present the content item to be transmitted and the content item being returned and presented to the user.

In some embodiments, the version of the content item returned to the user can be based on the client device used to request the content item. For example, a user that was presented a content item on their mobile device, can later request to revisit the content item on their PC and receive a version of the content item best suited for presentation by the PC, rather than the version presented on the mobile device. A user can thus, request to revisit a content item on a client device of their choice and be presented with a version of the content item best suited for the selected client device.

Figure 1:
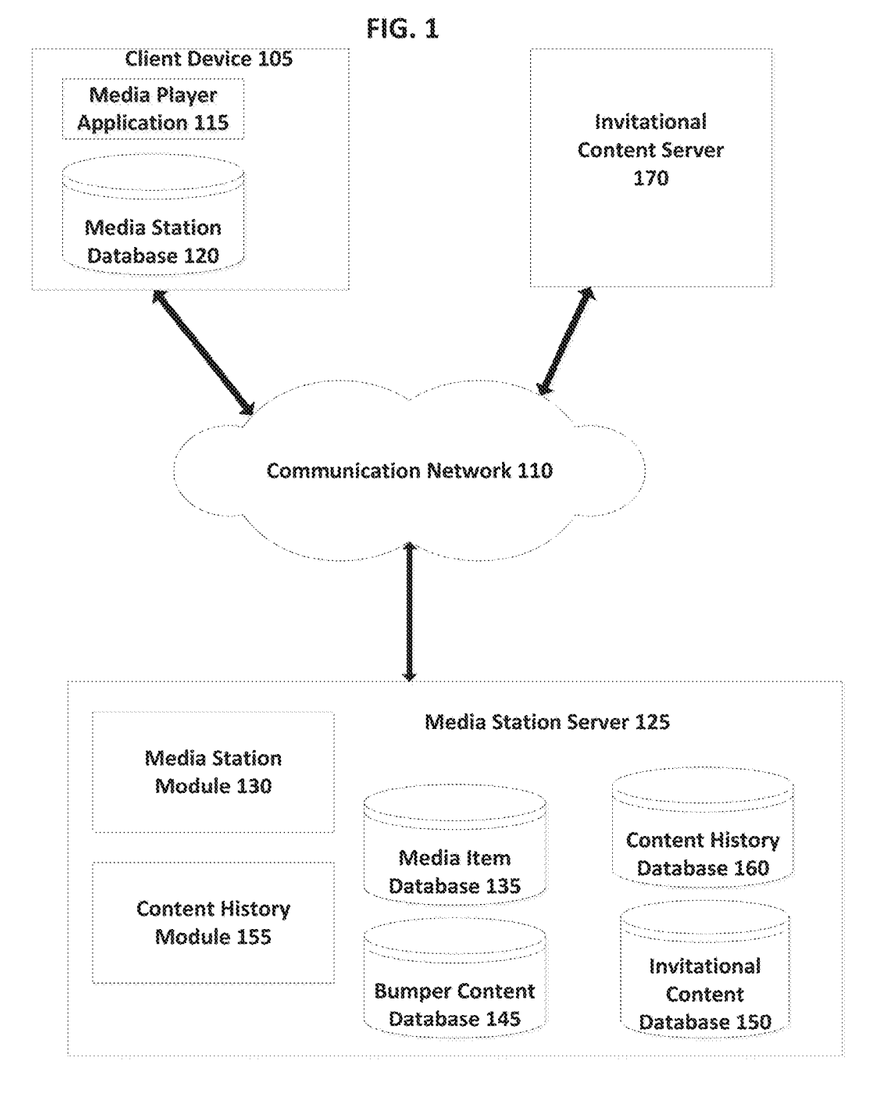
FIG. 1 exemplary system configuration 100 in which multiple computing devices can be configured to communicate with each other to create and perform a media station on a client device.

FIG. 1 illustrates an exemplary system configuration 100 in which multiple computing devices can be configured to communicate with each other to create and perform a media station on a client device. A media station can be a sequence of media items that can be played or executed by a media station player application on a client device. Some non-limiting example of media items can include songs, podcasts, television shows, movies, games, audiobooks, educational courses, and/or video. Media items can also include live broadcasts such as traffic, weather, news, sports, music festivals, etc., streamed in real time. Other media items are also possible. A media station player can be any application capable of media item playback, such as a component of a webpage, a plug-in, a client-side application, etc.

In some embodiments, a media station can be a continuous sequence of media items such that as one media item completes playback a next media item begins. The playback process of a continuous media item stream can repeat until a user takes an action to terminate or temporarily delay the playback, such as quitting the media player application, switching to a different media station, pausing playback, or skipping a media item. However, a media station can also be defined to be a finite sequence of media items. A media station can be homogeneous or heterogeneous. That is, a media station can be designed to playback media items all of the same media type or of different media types. For example, a homogeneous media station can playback only audio media items or only video media items. As another example, a homogenous media station can playback only pre-recorded media items or, alternatively, only media items that are streamed live, such as a continuous live music festival. A heterogeneous media station can playback a mix of audio media items and video media items. As another example, a heterogeneous media station can playback a mix of live and pre-recorded media items, such as pre-recorded songs mixed with live news and traffic updates. In some embodiments, the various media items can be presented concurrently such that presentation of one media item overlaps with presentation with a different media item.

A media station can also be configured to play or present invitational content, such as advertisements, within the media stream. An invitational content item can include content found in a media item, such as a song or a video, but an invitational content item can also include targeted content and/or content designed to elicit a response from a user. Therefore an invitational content item and a media item can be distinct item types, each of which can be presented in a media station.

In some embodiments, the invitational content can be used as a source of revenue and/or to subsidize a media station so that the media items can be provided to end users free of charge or for a reduced fee. The invitational content can be presented within a media station using a variety of techniques. In some cases, invitational content can be presented to a user in a manner that prevents or blocks the playback of a next media item or a next segment of a media item. For example, upon the completion of the playback of a music item, but before beginning playback of a new music item, an invitational content item can be presented in the media stream. Invitational content can also be displayed in conjunction with a media item or media item representation. For example, an invitational content item can be presented in a banner ad displayed with a music album cover or during the playback of a television show.

Further, in some embodiments, the invitational content can include an interactive segment that can be presented concurrently with one or more media items. The interactive segment can be configured such that a user can interact with the invitational content without disrupting playback of media items being presented concurrently. A user can thus interact with various features and views of the interactive segment during the playback of a media item without disrupting the media item. For example, in some embodiments, the interactive segment can be a rich media advertisement that includes various views and screens which a user can navigate through while listening to an audio media item.

A downside to presenting both invitational content and media items, either simultaneously or sequentially, when the invitational content is not related to the media items is that a user may equate the media item with the invitational content. For example, a user may think that an invitational content provider endorses a particular media item, or that a media item provider has authorized the use of the media item to promote an offering associated with the invitational content. To decrease the potential for confusion, the media station can also include bumper content, which can be presented concurrently with the interactive invitational content, but just prior to resuming playback of a media item.

A bumper content item can be an intermediary content item that is used to transition from invitational content to a media item, thereby creating user awareness that the media item is not related to an item of invitational content that the user may also be experiencing. For example, a bumper content item can be an audio message such as "now back to the music" that is used to transition between invitational content to an audio media item. Thus a user that is interacting with the interactive segment of an item of invitational content will be made aware that the upcoming media item is not related to the item of invitational content, even though the user is experiencing both concurrently.

To facilitate providing a media station to be performed by a client device, multiple computing devices can be connected to a communication network 110 and configured to communicate with each other through use of the communication network 110. The communication network 110 can be any type of network, including a local area network ("LAN"), such as an intranet, a wide area network ("WAN"), such as the internet, or any combination thereof. Further, the communication network 110 can be a public network, a private network, or a combination thereof. The communication network can also be implemented using any type or types of physical media, including wired communication paths and wireless communication paths associated with one or more service providers. Additionally, the communication network 110 can be configured to support the transmission of messages formatted using a variety of protocols.

A computing device can be any type of general computing device capable of network communication with other computing devices. For example, the computing device can be a personal computing device such as a desktop or workstation, a business server, or a portable computing device, such as a laptop, smart phone, or tablet personal computer. The computing device can include some or all of the features, components, and peripherals of computing device 500 of FIGS. 5A and 5B.

To facilitate communication with other computing devices, the computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As illustrated, a client device 105 can be configured to communicate with a media station server 125 to perform a media station on the client device 105. For example, a media player application 115 running on the client device 105 can be configured to communicate with a media station module 130 on the media station server 125 to request, receive and perform a media station. A media station player can be any application capable of media item playback, such as a component of a webpage, a plug-in, a client-side application, etc.

The media station module 130 can be configured to create a media station to be performed on a client device. For example, the media station module 130 can be configured to assemble the media station by selecting media items, invitational content items and bumper items to be performed on the client device in a specified order. For example, the media station server 125 can include a media item database 135, a bumper content database 145 and an invitational content database 150, each configured to store multiple media items, bumper content items, and invitational content items respectively. The media station module 130 can be configured to communicate with the databases to select media items, bumper content items and invitational content to be performed as part of the media station.

Although the media item database 135, bumper content database 145 and the invitational content database 150 are illustrated separately, this is just one possible embodiment and is not meant to be limiting. In some embodiments, the databases can be combined as one database or any other possible combination.

Alternatively, in some embodiments, the multiple databases can be hosted on separate computing devices and the media station module 130 can be configured to communicate with the various computing devices to assemble the media station. For example, in some embodiments, the system can include an invitational content server 170 in network communication with the media station server 125 and the media station module 130 can be configured to communicate with the invitational content server 170 to request invitational content to be included in the media station. In some embodiments, the invitational content server 170 can transmit the invitational content to the media station server 125 where it can be assembled into the media station. In some embodiments, the invitational content server 170 can transmit the invitational content directly to the client device 105.

In some embodiments, the media station module 130 can be configured to transmit the assembled media station to the client device 105 where it can be performed by the media player application 115. For example, the media station module 130 can be in continuous communication with the media player application 115 to transmit the media station to be performed by the media player application 115.

In some embodiments, the media station module 130 can be configured to transmit the media station to the client device 105 in segments. For example, the media station module 130 can be configured to communicate with the client device to transmit an assembled segment of the media station which can be stored on the client device 105 and performed by the media player application 115. For example, the client device 105 can include a media station database 120 configured to store the received media station and the media player application 115 can be configured to communicate with the media station database 120 to retrieve the stored media station. In this type embodiment, the media station module 130 can be configured to periodically update the client device 105 by transmitting further assembled segments of the media station.

In some embodiments, the media station can be assembled at the client device 105 rather than at the media station server 125. For example, the media station module 130 can be running on the client device 105 and can be configured to request media items, bumper content items and invitational content from the media station server 125, or any other computing device. The received media items, bumper content items and invitational content items can be stored in the media station database 120 and the media station module 130 can be configured to communicate with the media station database 120 to retrieve the stored media items, bumper content items and invitational content to assemble the media station. In this type of embodiment, the media station module 130 running on the client device 105 can be configured to periodically request further media items, bumper content items and invitational content be delivered to the client device.

The media station module 130 can be configured to assemble the media station based upon media station assembly rules. The media station assembly rules can dictate which media items, invitation content items and bumper content items should be selected for the media station as well as the sequential order in which they should be presented by the media player application 115.

In some embodiments, media station server 125 can be configured to maintain a content history of the content items presented to a user account as part of a media station or media station(s). The content presented to a user account can include media items, bumper content items and invitational content items presented to the user account. Media station server 125 can include content history module 155 configured to record the content history for user accounts. This can include detecting when a content item has been presented to a client device associated with or authorized to access the user account and recording that the content item has been presented to the user account.

To record the content history for a user account, content history module 155 can maintain a content history index that identifies the content items that have been presented to the user account. For example, the content history index can include a separate entry for each content item presented to the user account. Each entry in the content history index can include a content item identifier that uniquely identifies the content item that was presented to the user account. Alternatively, the content item identifier can identify a group of related content items, such as content items from the same artist, advertisers, same advertisement campaign, etc.

Media station server 125 can include content history database 160 configured to store content history indexes for multiple user accounts. Upon detecting that a content item has been presented to a user account, content history module 155 can be configured to access the appropriate content history index in content history index database 160, and add a new entry to the content history index that includes a content identifier identifying the content item that was presented to the user account.

To determine the appropriate content history index in which to record presentation of the content item, content history module 155 can identify the user account that the content item was presented to and access the content history index associated with the user account. In some embodiments, media station server 125 can require that a client device be authorized to access a user account as a prerequisite to requesting and receiving a media station. This can include providing login credential to access an existing user account or creating a new user account. Content history module 155 can determine the user account that the client device is authorized to access, and then access the content history index associated with the user account in content history database 160.

Alternatively, in some embodiments, media station server 125 may not require a user to create a user account. Rather, one or more client devices can be associated with each other to create a user account without user input. For example, media station server 125 can determine that one or more client devices are associated with the same user. Thus, the one or more client devices can be associated with an anonymous user account.

Content history module 155 can identify the appropriate content history index from the client devices associated with the user account that presented the content. For example, user account data associated with each user account can include one or more client device identifiers identifying client devices associated with the user account. Content history module 155 can identify the client device that received the invitational content item and determine the user account associated with the client device from the user account data.

In some embodiments, the content history index can include other metadata describing presentation of the content items. For example, each entry in the content history index can include metadata describing the content item (name, advertiser, advertisement campaign, artist, album, descriptive text, images, etc.), identifying the time the content item was presented, the client device that presented the content item, detected interaction with the content item, location of the client device when the content item was presented, etc. Content history module 155 can then gather this metadata from the client device and/or components and databases of media station server 125 and record the metadata in the content history index.

Content history module 155 can also be configured to provide a user account with the user account's content history. For example, content history module 155 can be configured to receive a content history request from client devices 102, and provide the appropriate content history in response to the content history request. This can include identifying the user account associated with the content history request, accessing the corresponding content history index, and transmitting the content history to the requesting client device.

In some embodiments, content history module 155 can return the entire content history. Alternatively, in some embodiments, content history module 155 can select a subset of the user account's content history to return. For example, content history module 155 can select the subset of the content history to return based on time. Content history module 155 can select the content items presented to the user account within a predetermined amount of time prior to receiving the content history request, such as the previous hour, day, week, month, etc.

Alternatively, content history module 155 can select a subset of the content history to return based on content type. For example, content history module 155 can select from only the media items and invitational content item that were presented at devices associated with the user account.

In some embodiments, content history module 155 can select a subset of the content history to return based on preferences provided by a user. In some embodiments, the preferences can be stored content history database 160 and associated with the content history index associated with the user account. Content history module 155 can access the preferences and select a subset of the content history according to the provided preferences.

In some embodiments, a user can provide preferences dictating the types of content the user would like to be presented in their content history. Alternatively, the user can select a date or time range for the content history. For example, the user can select to only receive the content history for the previous hour, day, week, etc. Content history module 155 can select the subset of the content history based on the user provided preferences.

In some embodiments, content history module 155 can select a subset of the content history based on the requesting client device. For example, content history module 155 can select only the content items that are capable of presentation by the requesting client device to include in the content history.

In some embodiments, content history module 155 can select a subset of the content history based on a network connection being utilized by the requesting client device. For example, content history module 155 can select to present only the content items that can be easily downloaded by the client device based on the network connection being utilized by the client device. Thus, content history module 155 can select only content items below a specified data size when the requesting client device is utilizing a slower network connection such as 3G, and select content items above the specified size if the client device is utilizing a faster network connection such as WiFi.

In some embodiments, content history module 155 can select the subset of content items based on a set of rules provided by a content provider. For example, a content provider can provide a set of conditions that must be met for the content item to be included in the content history. For example, the content provider can dictate a network connection type, client device type, etc., that must be met for a content item to be presented as part of a content history.

The content history provided in response to a content history request can include data identifying the content items presented to the user account, as well as metadata describing the content items. For example, the content history can include a name, time, description, image, etc. describing the content item in the content item history.

In some embodiments, the content history can be presented to a user in chronological order. For example, the content items can be presented in the order in which they were presented to the client device. Alternatively, in some embodiments, the content history can be presented to highlight one or more content item. For example, one select content item can be presented at the top of the content history in addition or instead of in its chronological order within the content history. Alternatively, a select content item can be presented with a highlighted background or with some other type of graphical presentation to bring attention to the select content item.

A content item can be a select content for numerous reasons. For example, a content item from a new artist or an advertisement from a featured sponsor can be select. Alternatively, the most recently presented advertisement can always be a select content item and presented in a highlighted fashion, either in chronological order or at the top of the content history.

Further, the content history can enable a user to revisit the content items included in the content history. For example, in some embodiments, content items presented in the content history can be presented as interactive elements that, when selected, cause the content item to be presented.

In some embodiments, the content history presented can be configured to allow a user to select to revisit any of the content items included in the content history. Alternatively, in some embodiments, the content history can be configured to allow a user to revisit only a subset of the content items included in the content history. For example, the content history can be configured to allow a user to only revisit content items of a specified type, such as only invitational content items. Alternatively, the content history can be configured to allow a user to only revisit content item presented within a predetermined time prior to presentation of the content item history; for example, only content items presented within the previous hour, day, week, etc.

To enable a user to revisit a content item included in the content history, the content history can include the content item identifier identifying the content item and, upon selection by a user to revisit the content item, the content item history can cause the client device rendering the content item history to transmit a content request to media station server 125 that includes the content item identifier. Upon receiving the a content request, content history module 155 can identify the content item identified by the content item identifier and return the identified content item to the requesting client device, where it can be rendered. For example, content history module 155 can request the content item from invitational content server 170.

In some embodiments, a user can select a specific content item to revisit without first being presented with the content history. For example, a user can utilize a speech recognition component of a client device 105 to request a specific content item based on when the content item was performed, content item type, title, etc. A user can thus verbally request to revisit the last content item performed, the last advertisement performed, the content item played 10 minutes ago, etc., to request to revisit the described content item.

Client device 105 can be configured to transmit a content request including the provided description to request the content item. For example, a content request can indicate that the user requested the last advertisement played. Content history module 155 can use the received metadata to identify the corresponding content item based on the metadata stored in the content history index. Upon identifying the appropriate entry, content history module 155 can access the content item identifier included in the entry and transmit the content item identified by the content item identifier to the requesting client device 105.

In some embodiments, content history module 155 can select a version of the content item to return in response to a content request based on the requesting client device. For example, content history module 155 can select and return a version of the content type that is best suited for presentation by the requesting client device. To accomplish this, content history module 155 can identify the type of the client device from which the content request was received and select a version of the requested content item accordingly. In some embodiments, the content request can include data identifying the client device type. In some embodiments, the client device type can be determined from data stored in a user profile associated with the user account.

In some embodiments, content history module 155 can select an alternate content item to return in response to a content request. For example, a user may select to revisit a content item that has since expired or been removed. For example, a content item such as an advertisement may only be available for a limited time, after which the advertisement expires and can no longer be accessed. In this type of situation, content history module 155 can select an alternate content item to present in response to the content request.

In some embodiments, the alternate content item can be selected based on the requested content item. Metadata associated with the content item can be used to select the alternate content item. For example, the alternate content item can be selected from other content items from the same advertiser, campaign, producer, artist, etc. Alternatively, the alternate content item selected can include similar content to the requested content item. For example, content history module 155 can select an alternate content item that advertises a similar type of product, service, etc., as the requested content item.

In some embodiments, the content history can enable a user to provide feedback regarding the content items. For example, the content history can include user interface elements such as buttons, checkboxes, text boxes, etc., configured to enable to receive input from a user regarding the content items. In some embodiments, the content history can enable a user to provide feedback indicating whether the user likes or dislikes a content item. Alternatively, in some embodiments, the content history can enable a user to enter whether the user would like to see more or less content items similar to a content item in the content history.

Figure 2:
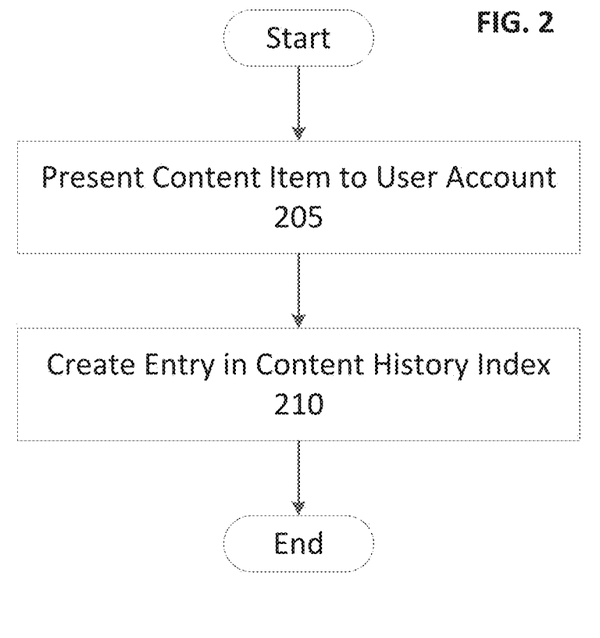
FIG. 2 illustrates an exemplary embodiment of recording a content history.

FIG. 2 illustrates an exemplary embodiment of recording a content history. As shown, the method begins at block 205 where a content item is provided to a client device. For example, the content item can be provided as part of a media stream such as an online radio station, television station, etc., which can be presented by a media player application on the client device. For example, the media player can render any audio, video, code, etc., included in the invitational content item to render the content item, which can include any of a media item, bumper item or invitational content item.

Upon providing the content item to the client device, the method continues to block 210 where a new entry is added to the appropriate content history index. Each user account can be associated with a content history index that identifies the content items presented to client devices authorized on the user account. For example, the content item index can include content item identifiers identifying the content items presented to the user account. A new entry in the content item index can be added that includes the invitational content item identifier identifying the content item presented to the user account.

In some embodiments, the entry in the content item index can also include other metadata describing the content item. For example, the content item index can include a title, artist, advertiser, image, etc. Further, the content item index can include metadata describing delivery of the content item, such as the time the content item was delivered, the client device type that presented the content item, any detected interaction with the content item, etc. The method then ends.

Figure 3:
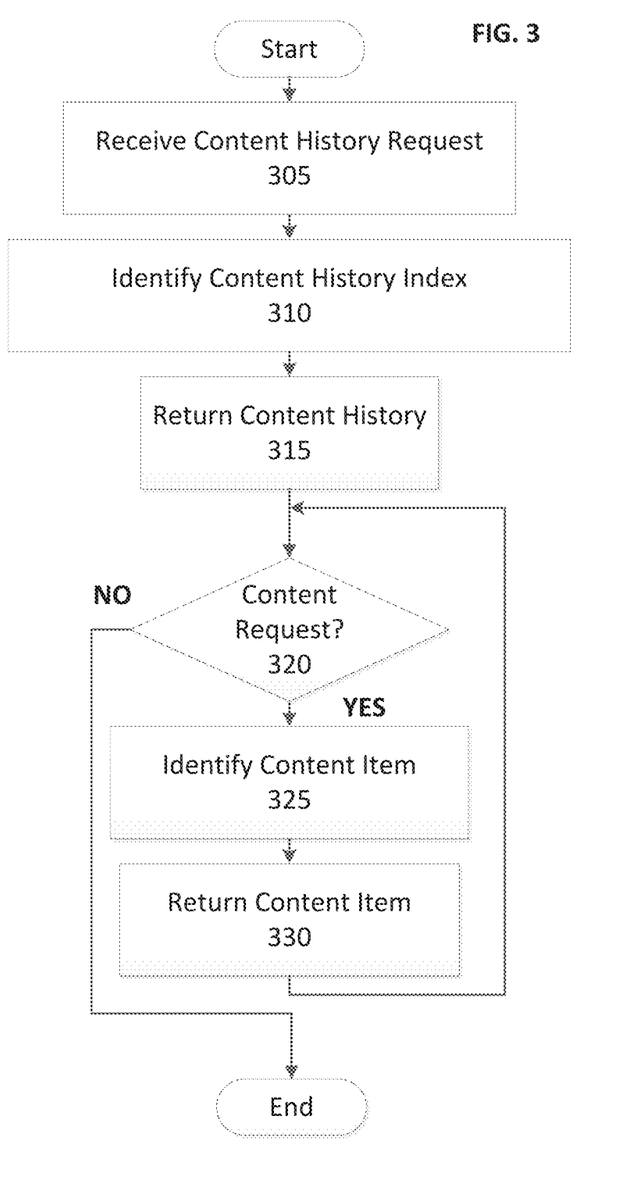
FIG. 3 illustrates an exemplary method embodiment of revisiting content items presented in a content history.

FIG. 3 illustrates an exemplary method embodiment of revisiting content items presented in a content history. As shown, the method begins at block 305 where a content history request is received. The content history request can be a request for the content history associated with a user account. For example, a client device authorized to access the user account can request to receive the content history for the user account by transmitting the content history request.

Upon receiving the content history request, the method continues to block 310 where the content history index associated with the user account is identified. For example, the user account that the client device is authorized to access can be identified and the corresponding content history index can be identified.

The method then continues to block 315 where the content history is returned. This can include returning all or a subset of the data included in the content history index. For example, the content history can include data identifying each content item included in the content history or, alternatively, a subset of the content items included in the content history.

In some embodiments, the content history can include only content items of a certain types, such as only invitational content items and media items. Further, the content history can include only a subset of the content items based on time. For example, the content history can include the content items presented to the user account within the last hour, day, week, etc.

The content history can include data identifying the content items as well as metadata describing the content items, such as a title, image, description, etc. The content history can also be configured to allow a user to select to revisit one of the content items listed in the content history. For example, in some embodiments, the content history can be configured to receive input enabling a user to select a content item that the user would like to revisit. Revisiting a content item can be presentation of the content item on a client device of the user. Upon selection of a content item to be revisited, the content history can cause a client device to transmit a content request requesting the selected content item.

Upon returning the content history in response to the content history request, the method continues to block 320 where it is determined if a content request is received. For example, the content request can be received as a result of a user selecting to revisit a content item presented in a content history. If at block 320 a content request is received, the method continues to block 325 where the requested content item is identified. In some embodiments, the content request can include the content item identifier that identifies the requested content item. The received content item identifier can be used to identify the requested content item.

Further, in some embodiments, an appropriate version of the content item can be identified. The version of the content item can be selected based on the requesting client device. For example, a version of the content item best suited to perform on the client device can be selected. This can include selecting a mobile version of the content item for a mobile client device. Alternatively, an enhanced version of the content item can be selected for client devices with capabilities to perform the enhanced capabilities, such as client devices with larger screens, increased computing capabilities, etc.

At block 330, the requested content item is returned in response to the content request. The method then continues to block 320, where, if a content request is not received, the method ends.

Figure 4:
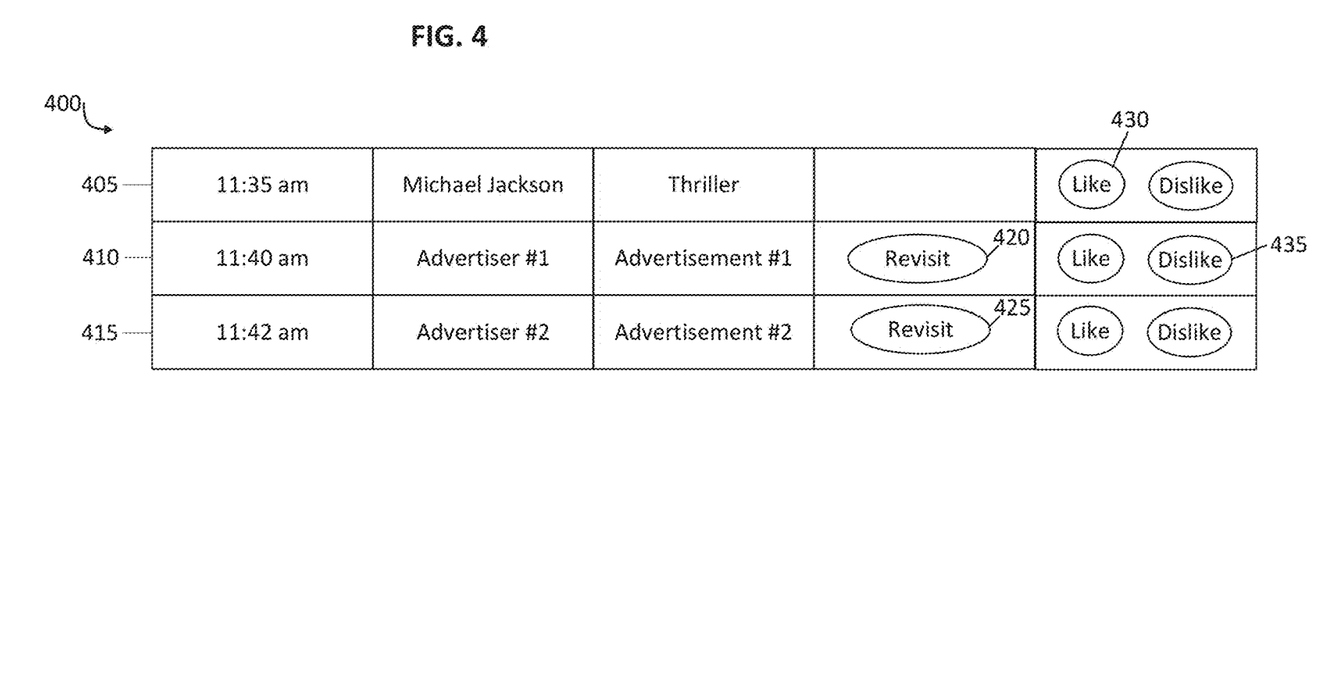
FIG. 4 illustrates an exemplary embodiment of a content history presented on a client device.

FIG. 4 illustrates an exemplary embodiment of a content history 400 presented on a client device. As shown, the content history identifies the six content items presented to a user between 11:35 am and 11:42 am. Each content item presented during that time span is represented by a separate entry in content history 400. Each entry includes data describing the content item presented. For example. Entry 405 indicates that at 11:35 am, the song "Thriller" by Michael Jackson was presented to the user. Further, entry 410 indicates that at 11:40 am, Advertisement #1 from Advertiser #1 was presented. Likewise, entry 415 indicates that at 11:42 am, Advertisement #2 by Advertiser #2 was presented to the user.

Although content history 400 is illustrated as only including the, time, author and title, this is only one possible embodiment and is not meant to be limiting. One skilled in the art would recognize that any metadata can be included in the content history, such as the client device the content item was presented on, an image, a description, etc., and this disclosure contemplates all such embodiments.

As shown, entries 410 and 415 include a user interface element button enabling a user to request revisit the content item identified by the respective entry. For example, a user can select user interface element 420 to revisit Advertisement #1 by Advertiser #1. Selection of user interface element 420 can result in a content request being transmitted that requests presentation of Advertisement #1, or some alternative thereof. Likewise, selection of user interface element 425 can result in a content request being transmitted that requests presentation of Advertisement #2, or some alternative thereof.

As shown, entry 405 does not include a user interface element enabling a user to revisit the content item. Thus, content history 400 is not configured to enable a user to revisit "Thriller" by Michael Jackson, although in other embodiments, each content item can be revisited.

Further each entry 405, 410 and 415, include feedback user interface elements that enable a user to provide feedback indicating whether the user likes or dislikes the content item. For example, a user can select user interface element 430 to provide feedback that the user likes "Thriller" by Michael Jackson, which can result in this content item and/or similar content items being presented to the user in the future. Likewise, a user can select user interface element 435 to indicate that the user does not like Advertisement #1, resulting in Advertisement #1 and/or advertisement by Advertiser #1 not being presented to the user in the future.

Although content history 400 is illustrated as only including user interface elements to receive user feedback regarding whether the user likes or dislikes a content item, this is only one possible embodiment and is not meant to be limiting. One skilled in the art would recognize that content history 400 can be configured to enable a user to provide any of a variety of feedback regarding a content item, such as a rating, comments, indication to see more like this, indication to see less like this, etc., and this disclosure contemplates all such embodiments.

Figure 5A:
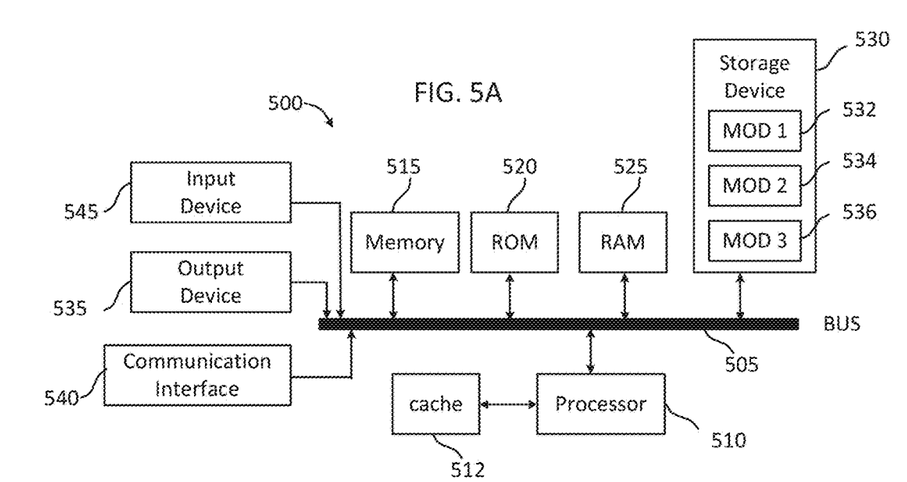
FIG. 5A and FIG. 5B illustrate exemplary possible system embodiments.
Figure 5B:
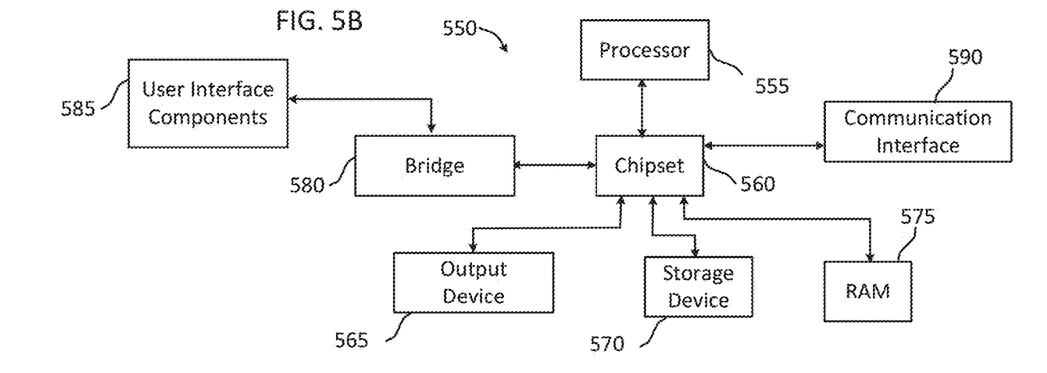

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A system comprising:
  at least one processor;
  at least one memory storing instructions which, when executed by the at least one processor, causes the at least one processor to:
  receive, from a second client device associated with a user account different than a first client device associated with the user account, a request for a content history index of the user account, wherein the content history index includes a plurality of content items where at least one content item of the plurality of content items was presented to the first client device associated with the user account;
  identify the content history index of the user account from a plurality of content history indices;
  present, to the second client device, a selectable subset of the plurality of content items of the content history index in chronological order, wherein each content item of the selectable subset includes an interactive video element of the content item and the selectable subset is determined based on a predetermined amount of time from the request;
  receive, from the second client device, a request to playback at least one content item of the selectable subset of the plurality of content items; and
  present, to the second client device, the at least one content item of the selectable subset of the plurality of content items for playback.

2. The system of claim 1, further comprising instructions which when executed by the at least one processor causes the at least one processor to:
  identify, based on a content item identifier of the at least one content item presented to the first client device, one or more related content items; and
  provide at least one of the one or more related content items with the at least one content item presented to the second client device.

3. The system of claim 1, wherein the selectable subset is based on a content type.

4. The system of claim 1, wherein the request for the content history index of the user account is a verbal request.

5. The system of claim 1, wherein the at least one content item of the selectable subset of the plurality of content items for playback is a media item.

6. The system of claim 1, wherein the selectable subset of the plurality of content items of the content history index is ordered based on user preferences.

7. The system of claim 1, wherein the at least one content item of the selectable subset of the plurality of content items for playback is unavailable for presentation and a substitute content item is presented for playback.

8. The system of claim 1, further comprising instructions which when executed by the at least one processor causes the at least one processor to:
  present, to the second client device, a second selectable subset of a plurality of content items, wherein the second selectable subset is determined based on at least similar metadata to the at least one content item of the plurality of content items that was presented to the first client device.

9. The system of claim 1, wherein the interactive video element of each content item of the selectable subset includes a title, description and image of the at least one content item.

10. The system of claim 1, wherein at least one content item of the selectable subset of the plurality of content items of the content history index is highlighted.

11. A non-transitory computer readable medium storing instructions, which when executed by at least one processor, causes the at least one processor to:
  receive, from a second client device associated with a user account different than a first client device associated with the user account, a request for a content history index of the user account, wherein the content history index includes a plurality of content items where at least one content item of the plurality of content items was presented to the first client device associated with the user account;
  identify the content history index of the user account from a plurality of content history indices;
  present, to the second client device, a selectable subset of the plurality of content items of the content history index in chronological order, wherein each content item of the selectable subset includes an interactive video element of the content item and the selectable subset is determined based on a predetermined amount of time from the request;
  receive, from the second client device, a request to playback at least one content item of the selectable subset of the plurality of content items; and
  present, to the second client device, the at least one content item of the selectable subset of the plurality of content items for playback.

12. The non-transitory computer readable medium of claim 11, further comprising instructions which when executed by the at least one processor causes the at least one processor to:
  identify, based on a content item identifier of the at least one content item presented to the first client device, one or more related content items; and
  provide at least one of the one or more related content items with the at least one content item presented to the second client device.

13. The non-transitory computer readable medium of claim 11, wherein the selectable subset is based on a content type.

14. The non-transitory computer readable medium of claim 11, wherein the request for the content history index of the user account is a verbal request.

15. The non-transitory computer readable medium of claim 11, wherein the at least one content item of the selectable subset of the plurality of content items for playback is a media item.

16. The non-transitory computer readable medium of claim 11, wherein the selectable subset of the plurality of content items of the content history index is ordered based on user preferences.

17. The non-transitory computer readable medium of claim 11, wherein the at least one content item of the selectable subset of the plurality of content items for playback is unavailable for presentation and a substitute content item is presented for playback.

18. A method for revisiting a content item, the method comprising:
   receiving, by at least one processor from a second client device associated with a user account different than a first client device associated with the user account, a request for a content history index of the user account, wherein the content history index includes a plurality of content items where at least one content item of the plurality of content items was presented to the first client device associated with the user account;
   identifying the content history index of the user account from a plurality of content history indices;
   presenting, to the second client device, a selectable subset of the plurality of content items of the content history index in chronological order, wherein each content item of the selectable subset includes an interactive video element of the content item and the selectable subset is determined based on a predetermined amount of time from the request;
   receiving, by the at least one processor from the second client device, a request to playback at least one content item of the selectable subset of the plurality of content items; and
   presenting, to the second client device, the at least one content item of the selectable subset of the plurality of content item for playback.

19. The method of claim 18, further comprising:
   identifying, by the at least one processor and based on a content item identifier of the at least one content item presented to the first client device, one or more related content items; and
   providing at least one of the one or more related content items with the at least one content item presented to the second client device.

20. The method of claim 18, wherein the selectable subset is based on a content type.

21. The method of claim 18, wherein the request for the content history index of the user account is a verbal request.

22. The method of claim 18, wherein the at least one content item of the selectable subset of the plurality of content items for playback is a media item.

23. The method of claim 18, wherein the selectable subset of the plurality of content items of the content history index is ordered based on user preferences.

24. The method of claim 18, wherein the at least one content item of the selectable subset of the plurality of content items for playback is unavailable for presentation and a substitute content item is presented for playback.

* * * * *